United States Patent
Ozbek et al.

(10) Patent No.: US 7,817,495 B2
(45) Date of Patent: Oct. 19, 2010

(54) JOINTLY INTERPOLATING AND DEGHOSTING SEISMIC DATA

(75) Inventors: Ali Ozbek, Milton (GB); Ahmet Kemal Ozdemir, Asker (NO); Massimiliano Vassallo, Brighton (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/131,870

(22) Filed: Jun. 2, 2008

(65) Prior Publication Data

US 2009/0296523 A1 Dec. 3, 2009

(51) Int. Cl.
*G01V 1/38* (2006.01)
(52) U.S. Cl. ........................................ 367/24
(58) Field of Classification Search .............. 367/21–24
See application file for complete search history.

(56) References Cited

U.S. PATENT DOCUMENTS

| | | | | |
|---|---|---|---|---|
| 5,850,622 | A * | 12/1998 | Vassiliou et al. ............... | 702/17 |
| 6,704,244 | B1 * | 3/2004 | Vaage .......................... | 367/24 |
| 2005/0117451 | A1 * | 6/2005 | Robertsson ................... | 367/24 |
| 2007/0219765 | A1 * | 9/2007 | Calvert et al. ................. | 703/6 |
| 2008/0186804 | A1 * | 8/2008 | Amundsen et al. ............ | 367/24 |
| 2008/0312878 | A1 * | 12/2008 | Robertsson et al. ......... | 702/189 |
| 2009/0067285 | A1 * | 3/2009 | Robertsson et al. .......... | 367/24 |

OTHER PUBLICATIONS

Stephane G. Mallat, Matching Pursuits with Time-Frequency Dictionaries, IEEE, Dec. 1993, vol. 41, No. 12.

* cited by examiner

*Primary Examiner*—Jack Keith
*Assistant Examiner*—Krystine Breier

(57) ABSTRACT

A technique includes representing actual measurements of a seismic wavefield as combinations of an upgoing component of the seismic wavefield and ghost operators. Interpolated and deghosted components of the seismic wavefield are jointly determined based at least in part on the actual measurements and the representation.

20 Claims, 4 Drawing Sheets

JOINTLY INTERPOLATING AND DEGHOSTING SEISMIC DATA

BACKGROUND

The invention generally relates to jointly interpolating and deghosting seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes representing actual measurements of a seismic wavefield as combinations of an upgoing component of the seismic wavefield and ghost operators. Interpolated and deghosted components of the seismic wavefield are jointly determined based at least in part on the actual measurements and the representation.

In another embodiment of the invention, a system includes system includes an interface and a processor. The interface receives actual measurements of a seismic wavefield, which are acquired by seismic sensors. The processor is adapted to represent the actual measurements of the seismic wavefield as combinations of an upgoing component of the seismic wavefield and ghost operators; and the processor is adapted to jointly determine interpolated and deghosted components of the seismic wavefield based at least in part on the actual measurements and the representation.

In yet another embodiment of the invention, an article includes instructions that are stored on a computer accessible storage medium that when executed by a processor-based system cause the processor-based system to represent actual measurements of a seismic wavefield as combinations of an upgoing component of the seismic wavefield and ghost operators. The instructions when executed also cause the processor-based system to jointly determine interpolated and deghosted components of the seismic wavefield based at least in part on the measurements and the representation.

Advantages and other features of the invention will become apparent from the following drawing, description and claims.

DETAILED DESCRIPTION

Figure 1:
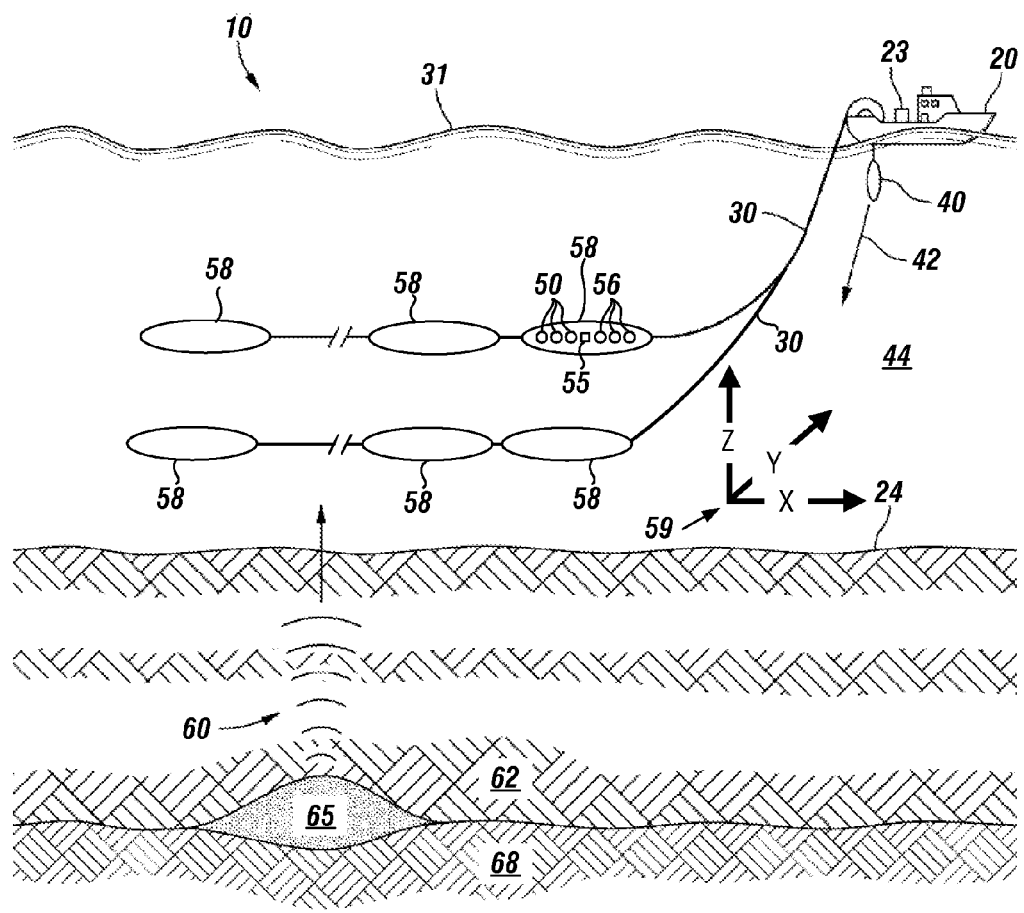
FIG. 1 is a schematic diagram of a marine acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 4:
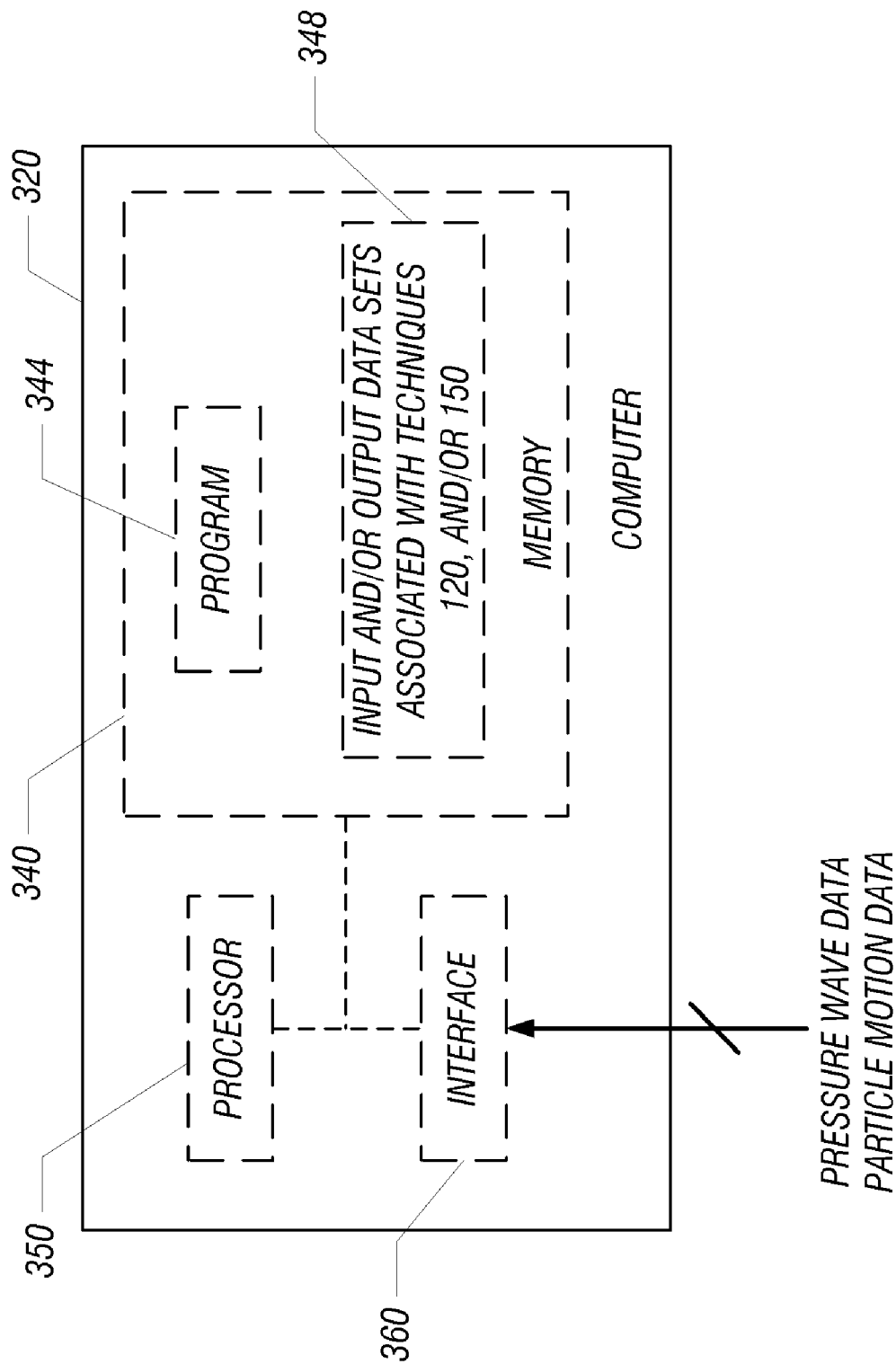
FIG. 4 is a schematic diagram of a schematic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 4 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data that are provided by the multi-component seismic sensors 58 allows the recovery of "ghost" free data, which means data that are indicative of the upgoing wavefield.

Deghosted and interpolated seismic data typically are essential for many important seismic data processing tasks, such as imaging, multiple attenuation, time-lapse seismic processing, etc. In accordance with embodiments of the invention described herein, techniques are described that provide for concurrent, or joint, interpolation and deghosting of the acquired seismic data. More specifically, the seismic data are obtained by the regular or irregular sampling of the pressure and particle motion data. As an example, these data may be sampled along one or more streamers in the marine environment or may be sampled by seismic sensors located on the sea bed, as another example.

Techniques and systems are described herein that jointly interpolate and deghost acquired seismic data. More specifically, based on the measurements that are acquired by the multi-component sensors, an upgoing component of the pressure wavefield (herein called "$p_u(x, y; z_s, f)$") component is determined at the seismic sensor locations, as well as at locations other than the sensor locations, without first interpolating the acquired seismic data and then deghosting the interpolated data (or vice versa).

The upgoing pressure wave component $p_u(x, y; z_s, f)$ at a temporal frequency f and cable depth $z_s$ may, in general, be modeled as a continuous signal as the sum of J sinusoids that have complex amplitudes (called "$A_j$"), as set forth below:

$$p_u(x, y; z_s, f) = \sum_{j=1}^{J} A_j e^{j2\pi(k_{x,j}x + k_{y,j}y + k_{z,j}z_s)}. \quad \text{Eq. 1}$$

In Eq. 1, "$k_{x,j}$" represents the inline wavenumber for index j; "$k_{y,j}$" represents the crossline wavenumber for index j; "$z_s$" represents the streamer tow depth; "f" represents the temporal frequency of the sinusoids; and "c" represents the acoustic velocity in water. Additionally, "$k_{z,j}$," the wavenumber in the vertical, or depth, direction may be described as follows:

$$k_{z,j} = f/c\sqrt{1 - c^2(k_{x,j}^2 + k_{y,j}^2)/f^2}. \quad \text{Eq. 2}$$

Based on the representation of the upgoing pressure component $p_u(x, y; z_s, f)$ in Eq. 3, the pressure and particle motion measurements may be represented as continuous signals described below:

$$m^P(x, y; z_s, f) = \quad \text{Eq. 3}$$
$$\sum_{j=1}^{P} A_j H(k_{x,j}, k_{y,j}; z_s, f) e^{j2\pi(k_{x,j}x + k_{y,j}y + k_{z,j}z_s)},$$

where "$m^P(x, y; z_s, f)$" represents a measurement vector, which includes the pressure and orthogonal components of the particle velocity in the inline, crossline and vertical coordinates, respectively. Thus, the measurements of the vector $m^P(x, y; z_s, f)$ are contiguous.

The measurement vector $m^P(x, y; z_s, f)$ may be described as follows:

$$m^P(x,y;z_s,f) = [p^P(x,y;z_s,f) v_x^P(x,y;z_s,f) v_y^P(x,y;z_s,f) v_z^P(x,y;z_s,f)]^T, \quad \text{Eq. 4}$$

where "$H(k_x, k_y; z_S, f)$" represents a ghosting operator, which is defined as follows:

$$H(k_x, k_y; z_s, f) = \begin{bmatrix} (1 + \xi e^{j4\pi k_z z_s}) \frac{ck_x}{f} \\ (1 + \xi e^{j4\pi k_z z_s}) \frac{ck_y}{f} \\ (1 + \xi e^{j4\pi k_z z_s}) \frac{ck_z}{f}(1 - \xi e^{j4\pi k_z z_s}) \end{bmatrix}^T. \quad \text{Eq. 5}$$

In Eq. 5, "$z_s$" represents the streamer depth; and $\zeta$ represents the reflection coefficient of the sea surface.

Due to the relationships set forth in Eqs. 1 and 3, the $A_j$ parameters may be determined for purposes of jointly interpolating the acquired seismic data and determining the upgoing pressure component $p_u(x, y; z_s, f)$.

Figure 2:
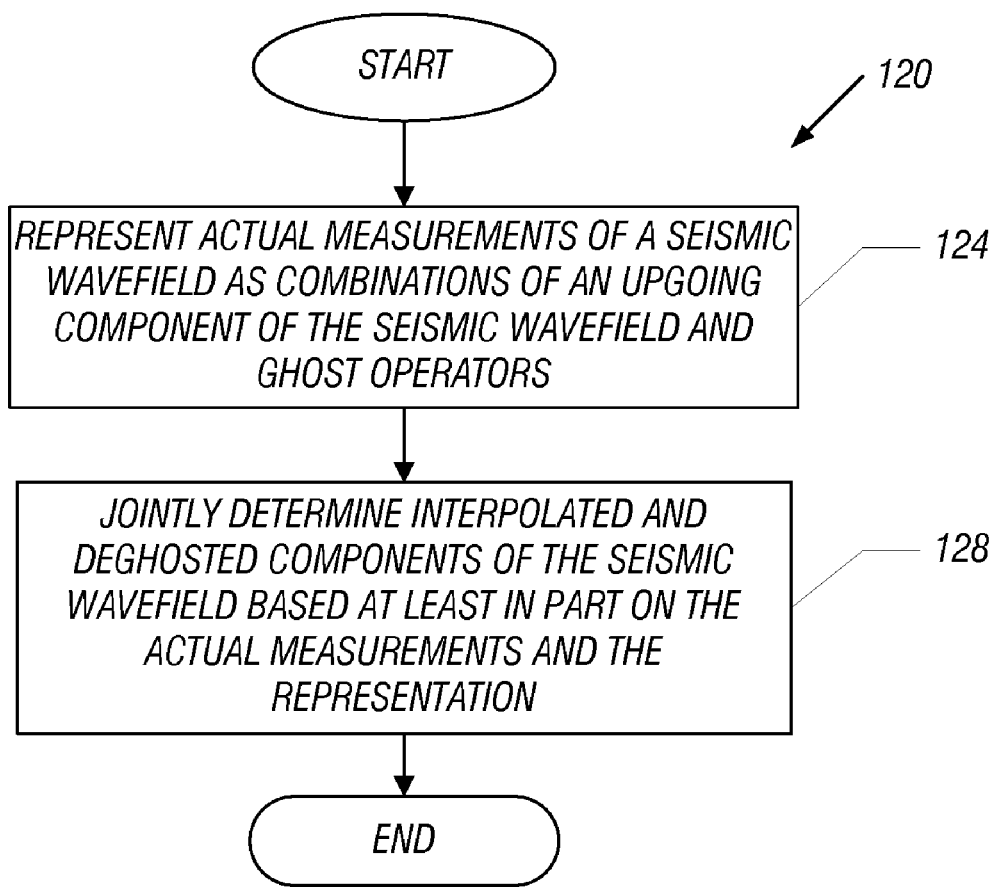
FIGS. 2 and 3 are flow diagrams depicting techniques to jointly interpolate and deghost seismic data according to embodiments of the invention.

More specifically, referring to FIG. 2, in accordance with some embodiments of the invention, a technique 120 to generate an upgoing component of a seismic data wavefield, such as an upgoing pressure component, includes representing (block 124) actual measurements of a seismic wavefield as combinations of an upgoing component of the seismic wavefield and ghost operators. Pursuant to the technique 120, the interpolated and deghosted components of the seismic wavefield are determined based at least in part on the actual measurements and the representation, pursuant to block 128.

Eqs. 1 and 3 define the upgoing pressure component $p_u(x, y; z_s, f)$ and measurement vector $m^P(x, y; z_s, f)$ as a combination of sinusoidal basis functions. However, it is noted that the component $p_u(x, y; z_s, f)$ and the measurement vector $m^P(x, y; z_s, f)$ may be represented as a combination of other types of basis functions, in accordance with other embodiments of the invention.

If the sinusoids in Eq. 3 were not subject to the ghosting operators, then a matching pursuit technique could be used to identify the parameters of the sinusoids. The matching pursuit technique is generally described in S. Mallat and Z. Zhang Mallat "Matching pursuits with time-frequency dictionaries" IEEE Transactions on Signal Processing, vol. 41, no. 12, pp. 3397-3415 (1993). The matching pursuit algorithm may be regarded as an iterative algorithm, which expands a particular signal in terms of a linear combination of basis functions. As described herein, the matching pursuit algorithm is generalized to the cases where the signal is represented as a linear combination of basis functions that are subject to some linear transformation, e.g., the ghosting operation. This generalized technique described herein is referred to as the Generalized Matching Pursuit (GMP) algorithm.

Figure 3:
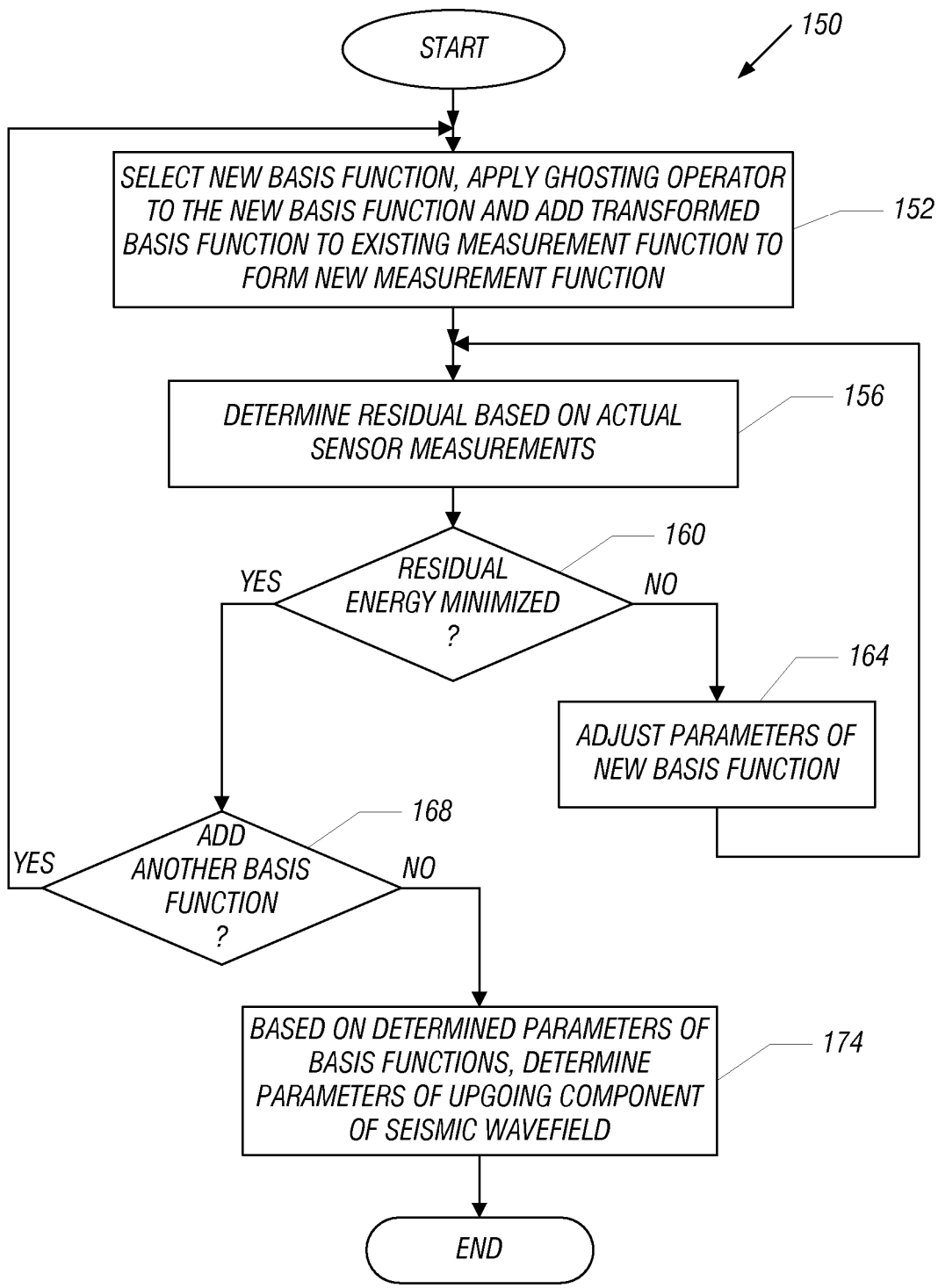

Referring to FIG. 3, in accordance with some embodiments of the invention, a technique 150 may be used for purposes of determining the coefficients of Eqs. 1 and 3. In this regard, the technique 150 includes, pursuant to block 152, selecting a new basis function, applying the ghosting operator $H(k_x, k_y; z_s, f)$ to the new basis function and adding the transformed basis function to an existing measurement function to form a new measurement function. In this regard, after the first basis function (which may be in the simplest form a single sinusoidal function or even a constant) is added, a new exponential is added at every iteration to the set of basis functions used, and the corresponding "ghosted" basis function is added to the representation; and then, an error, or residual, is determined based on the actual seismic data that are acquired by the sensor measurements, pursuant to block 156.

The residual energy is then minimized for purposes of determining the $A_j$ parameters for the new basis function. More specifically, a determination is made (diamond 160) whether the residual energy has been minimized with the current parameters for the new basis function. If not, the parameters are adjusted and the residual energy is again determined, pursuant to block 156. Thus, a loop is formed for purposes of minimizing some metric of the residual energy until a minimum value is determined, which permits the coefficients for the next basis function to be determined. Therefore, pursuant to diamond 168, if another basis function is to be added (based on a predetermined limit of basis functions, for example), the technique 150 continues with block 152 to add the next basis function and calculate the corresponding parameters. Otherwise, if no more basis functions are to be added, the upgoing component of the seismic event is determined, pursuant to block 174.

As a more specific example, the $A_j$ parameters for the newest basis function may be determined by minimizing the energy of the residual. Therefore, if P−1 basis functions have been determined previously, the representation of the component $p_u(x, y; z_s, f)$ with the P−1 sinusoids may be as follows:

$$p_u(x, y; z_s, f) = \sum_{j=1}^{P-1} A_j e^{j2\pi(k_{x,j}x + k_{y,j}y + k_{z,j}z_s)}. \qquad \text{Eq. 6}$$

The corresponding measurement function for the P−1 basis functions may be obtained by applying the ghost operators to the basis functions:

$$m^{P-1}(x, y; z_s, f) \approx \sum_{j=1}^{P-1} A_j H(k_{x,j}, k_{y,j}; z_s, f) e^{j2\pi(k_{x,j}y + k_{z,j}z_s)}. \qquad \text{Eq. 7}$$

The residual in the approximation, called "$r^{P-1}(x, y; z_s, f)$" may be defined as follows:

$$r^{P-1}(x, y; z_s, f) = \qquad \text{Eq. 8}$$

$$m(x, y; z_s, f) - \sum_{j=1}^{P-1} A_j H(k_{x,j}, k_{y,j}; z_s, f) e^{j2\pi(k_{x,j}y + k_{z,j}z_s)}.$$

If a new basis function "$\overline{A}_P e^{j2\pi(\overline{k}_{x,P}y + \overline{k}_{z,P}z_s)}$," which has a corresponding coefficient called "$\overline{A}_P$" is added to the existing representation of the upgoing wavefield, then the residual may be rewritten as follows:

$$r^P_{(\overline{A}_P, \overline{k}_{x,P}, \overline{k}_{y,P})}(x, y; z_s, f) = r^{P-1}(x, y; z_s, f) - \overline{A}_P H(\overline{k}_{x,P}, \overline{k}_{y,P}; z_s, f) e^{j2\pi(\overline{k}_{x,P}x + \overline{k}_{y,P}y + \overline{k}_{z,P}z_s)}. \qquad \text{Eq. 9}$$

It is noted that for Eq. 9, the parameters $\overline{A}_P, \overline{k}_{x,P}, \overline{k}_{y,P}$ for the new basis function term are determined.

As a specific example, the parameters of the new basis function may be found by minimizing some metric of the residual, which is calculated over inline and crossline sensor locations, as described below:

$$(k_{x,P}, k_{y,P}, A_P) = \arg\min_{(\overline{A}_P, \overline{k}_{x,P}, \overline{k}_{y,P})} M(\overline{A}_P, \overline{k}_{x,P}, \overline{k}_{y,P}; z_s, f), \qquad \text{Eq. 10}$$

One such example metric may be described as follows:

$$M(\overline{A}_P, \overline{k}_{x,P}, \overline{k}_{y,P}; z_s, f) = \qquad \text{Eq. 11}$$

$$\sum_{m,n} \left( r^P_{(\overline{A}_P, \overline{k}_{x,P}, \overline{k}_{y,P})}(x, y; z_s, f) \right)^H C^{-1}$$

$$r^P_{(\overline{A}_P, \overline{k}_{x,P}, \overline{k}_{y,P})}(x, y; z_s, f),$$

where "C" represents a four by four positive definite matrix; "$x_m$" represents the sensor locations in the inline direction; and "$y_n$" represents the sensor locations in the crossline direction.

Referring to FIG. 4, in accordance with some embodiments of the invention, a seismic data processing system 320 may perform at least some of the techniques that are disclosed herein for purposes of jointly interpolating and deghosting seismic data. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and/or particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various input and/or output data sets involved with the techniques 120 and/or 150, as indicated by reference numeral 348. The memory 340 may store program instructions 344, which when executed by the processor 350, may cause the processor 350 to perform one or more of the techniques that are disclosed herein, such as the techniques 120 and/or 150 and display results obtained via the technique(s) on a display (not shown in FIG. 4) of the system 320, in accordance with some embodiments of the invention.

Other embodiments are within the scope of the appended claims. For example, in other embodiments of the invention, the seismic data may be acquired using another type of seismic acquisition platform, such as a set of ocean bottom cables, as a non-limiting example.

As additional examples of other embodiments of the invention, the measurements that are obtained may be irregularly or regularly sampled with respect to space and/or time. Additionally, the techniques that are described herein may be used to determine a downgoing pressure or particle motion component. Additionally, the techniques that are described herein may be used with a subset of particle motion measurements (i.e., measurements in less than all three dimensions). For example, in accordance with some embodiments of the invention, interpolation may be performed in the cross-line direction and the seismic data may be deghosted when only pressure and the "vertical" component of the particle velocity are measured. As another example, the seismic data may be interpolated and deghosted when pressure, the "vertical" component of the particle velocity and the "cross-line" component of the particle velocity are used. Other variations are contemplated and are within the scope of the appended claims.

As another variation, in accordance with some embodiments of the invention, the measurement function may be represented as multiple signals, where each signal is associated with a different frequency band. In this regard, the signal for each frequency band may be separately, or independently, interpolated. Additionally, different spatial bandwidths may be used in the different frequency bands for the representation of the upgoing wavefield by the combined basis functions. It is noted that the different spatial bandwidths may be determined by the speed of propagation of the signals.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
representing actual measurements of a seismic wavefield as a combination of a component of the seismic wavefield associated with a one way direction of propagation and a ghost operator;
receiving first data indicative of the actual measurements of the seismic wavefield; and
simultaneously determining interpolated and deghosted components of the seismic wavefield based at least in part on the actual measurements and the representation, comprising processing the first data in a machine to produce second data indicative of the interpolated and deghosted components of the seismic wavefield.

2. The method of claim 1, wherein the act of representing comprises representing the component of the seismic wavefield associated with the one way direction of propagation as a linear combination of basis functions.

3. The method of claim 2, wherein the act of determining comprises determining parameters of the linear combination of the basis functions using a generalized matching pursuit technique.

4. The method of claim 2, wherein the act of determining comprises determining parameters of the linear combination of basis functions in an iterative sequence of adding a basis function to the existing linear combination of basis functions, and determining coefficients associated with the added basis function.

5. The method of claim 4, wherein the act of determining the coefficients associated with the added basis function comprises:
applying the ghost operator to the added basis function to generate a transformed basis function;
adding the transformed basis function to an existing representation of the actual measurements to generate a new representation of the actual measurements; and
minimizing a residual between the actual measurements and the new representation of the actual measurements.

6. The method of claim 1, wherein the act of simultaneously determining the component of the seismic wavefield associated with the one way direction of propagation comprises determining an upgoing component or a downgoing component of a pressure.

7. The method of claim 1, wherein the act of simultaneously determining the component of the seismic wavefield associated with the one way direction of propagation comprises determining an upgoing component or a downgoing component of a particle motion.

8. The method of claim 1, wherein the ghost operator comprises an operator that is a function of at least one of an acoustic velocity, a streamer depth and a sea surface reflection coefficient.

9. The method of claim 1, wherein the actual measurements comprise a vector of pressure and particle motion measurements.

10. The method of claim 9, wherein the actual measurement vector comprises the three particle motion components in addition to the pressure component.

11. The method of claim 9, wherein the actual measurement vector comprises any subset of pressure and particle motion components.

12. The method of claim 1, wherein the actual measurements comprise measurements acquired by a spread of towed streamers.

13. The method of claim 1, wherein the actual measurements comprise measurements acquired by a spread of over/under streamers or a set of ocean bottom cables.

14. The method of claim 1, wherein the actual measurements comprise measurements acquired at regularly or irregularly spaced positions and/or times.

15. The method of claim 1, wherein the actual measurements comprise measurements in a three-dimensional space.

16. The method of claim 1, wherein the act of determining comprises:
    representing the measurements as signals associated with a plurality of frequency bands; and
    determining the signals independently.

17. The method of claim 16, wherein the act of determining further comprises:
    using different spatial bandwidths in the different frequency bands for the representation of an upgoing wavefield by combining basis functions.

18. The method of claim 17, wherein the different spatial bandwidths are based on the speed of propagation of the signals.

19. The method of claim 1, wherein the component of the seismic wavefield associated with the one way direction of propagation comprises an upgoing component of the seismic wavefield.

20. The method of claim 1, wherein the component of the seismic wavefield associated with the one way direction of propagation comprises a downgoing component of the seismic wavefield.

* * * * *